US012576988B2

(12) United States Patent
Jha et al.

(10) Patent No.: US 12,576,988 B2
(45) Date of Patent: Mar. 17, 2026

(54) AIRCRAFT LIGHT, AIRCRAFT COMPRISING AN AIRCRAFT LIGHT, AND METHOD OF ASSEMBLING AN AIRCRAFT LIGHT

(71) Applicant: Goodrich Lighting Systems GmbH & Co. KG, Lippstadt (DE)

(72) Inventors: Anil Kumar Jha, Lippstadt (DE); Andre Hessling-von Heimendahl, Koblenz (DE); Elmar Schrewe, Anröchte (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/887,326

(22) Filed: Sep. 17, 2024

(65) Prior Publication Data

US 2025/0100712 A1     Mar. 27, 2025

(30) Foreign Application Priority Data

Sep. 26, 2023     (EP) ..................................... 23199674

(51) Int. Cl.
| | |
|---|---|
| *B64D 47/00* | (2006.01) |
| *B64D 11/00* | (2006.01) |
| *B64D 47/04* | (2006.01) |
| *B64D 47/06* | (2006.01) |
| *F21V 29/503* | (2015.01) |
| *F21Y 113/00* | (2016.01) |

(52) U.S. Cl.
CPC .............. *B64D 47/04* (2013.01); *B64D 11/00* (2013.01); *B64D 47/06* (2013.01); *F21V 29/503* (2015.01); *B64D 2011/0038* (2013.01); *F21Y 2113/00* (2013.01)

(58) Field of Classification Search
CPC ........ B64D 47/04; B64D 47/06; B64D 11/00; F21V 29/503
See application file for complete search history.

(56) References Cited

U.S. PATENT DOCUMENTS

| | | | |
|---|---|---|---|
| 8,927,872 | B2 | 1/2015 | Zhang et al. |
| 10,199,904 | B2 | 2/2019 | Sasaki et al. |
| 10,269,678 | B1 | 4/2019 | Viswanathan et al. |

(Continued)

FOREIGN PATENT DOCUMENTS

| | | |
|---|---|---|
| EP | 2890224 | 7/2015 |

OTHER PUBLICATIONS

European Patent Office; European Search Report dated Mar. 18, 2024 in Application No. 23199674.5.

*Primary Examiner* — Gerald J Sufleta, II
(74) *Attorney, Agent, or Firm* — SNELL & WILMER L.L.P.

(57) ABSTRACT

An aircraft light comprises a light source support board, having a light source side and a back side; and a light source, arranged on the light source side of the light source support board; wherein the light source support board comprises a first metallic layer, the first metallic layer forming conductive traces on the light source side of the light source support board; an isolating layer; a second metallic layer, wherein the isolating layer is arranged between the first metallic layer and the second metallic layer and isolates the second metallic layer from the first metallic layer; and a support board core layer. A cavity is provided in the support board core layer.

20 Claims, 6 Drawing Sheets

(56)                References Cited

U.S. PATENT DOCUMENTS

| 10,499,500 | B2 | 12/2019 | Berkel et al. | |
| 11,158,219 | B2 * | 10/2021 | Burghy | G09F 9/33 |
| 11,160,160 | B1 | 10/2021 | Berkel et al. | |
| 11,297,700 | B2 * | 4/2022 | Lee | H05B 45/10 |
| 2006/0082315 | A1 * | 4/2006 | Chan | H05K 3/308 |
| | | | | 362/640 |
| 2011/0101410 | A1 | 5/2011 | Lin et al. | |
| 2011/0186873 | A1 | 8/2011 | Emerson | |
| 2012/0292655 | A1 * | 11/2012 | Yeh | H05K 1/0203 |
| | | | | 438/26 |

* cited by examiner

Fig. 1B

AIRCRAFT LIGHT, AIRCRAFT COMPRISING AN AIRCRAFT LIGHT, AND METHOD OF ASSEMBLING AN AIRCRAFT LIGHT

CROSS-REFERENCE TO RELATED APPLICATIONS

This application claims priority to EP Patent Application No. 23199674.5, filed Sep. 26, 2023 and titled "AIRCRAFT LIGHT, AIRCRAFT COMPRISING AN AIRCRAFT LIGHT, AND METHOD OF ASSEMBLING AN AIR-CRAFT LIGHT," which is incorporated by reference herein in its entirety for all purposes.

FIELD

The present invention relates to aircraft lighting. In particular, the present invention relates to an aircraft light. The present invention further relates to an aircraft comprising such an aircraft light and to a method of assembling an aircraft light.

BACKGROUND

Almost all aircraft are equipped with numerous lights, including exterior aircraft lights and interior aircraft lights. In particular, large passenger airplanes are provided with a wide variety of exterior and interior aircraft lights.

Exterior aircraft lights are employed for a wide variety of different purposes, such as for allowing the passengers and/or air crew to view the outside, for passive visibility, for signaling purposes, etc. Examples of such exterior light units are navigation lights, also referred to as position lights, red-flashing beacon lights, white strobe anti-collision lights, wing scan lights, engine scan lights, take-off lights, landing lights, taxi lights, runway turn-off lights, etc.

Passenger aircraft, such as commercial airplanes, which comprise a passenger cabin with passenger seats, are usually equipped with general passenger cabin lights for illuminat-ing the passenger cabin and washroom illumination lights for illuminating washrooms. Such passenger aircraft are usually further equipped with a plurality of individually switchable passenger reading lights and a plurality of indi-vidually switchable signal lights. All of these lights are examples of interior aircraft lights.

Every aircraft light comprises a light source for generat-ing a light output. In operation, the light source may generate heat. There may be a need for dissipating said heat, in order to prevent the light source from overheating and/or in order to maintain good thermal operating conditions for achieving a long lifetime of the light source.

Accordingly, it would be beneficial to provide an aircraft light comprising a light source, wherein the aircraft light allows for an efficient dissipation of heat, which is generated when the light source is operating.

SUMMARY

Exemplary embodiments of the invention include an aircraft light comprising a light source support board and a light source. The light source support board has a light source side and an opposite back side, with the light source being arranged on the light source side of the light source support board. The light source support board comprises a layered structure including a first metallic layer forming conductive traces on the light source side of the light source support board; an isolating layer; a second metallic layer; and a support board core layer. The isolating layer is arranged between the first metallic layer and the second metallic layer, isolating the second metallic layer from the first metallic layer. A cavity is provided in the support board core layer. The aircraft light further comprises a metallic body, which is arranged within the cavity formed in the support board core layer. The metallic body has an inner end face at a first end, and an outer end face at an opposite second end. The inner end face is soldered to the second metallic layer. The outer end face is substantially flush with the back side of the light source support board.

A light source support board of an aircraft light according to an exemplary embodiment of the invention allows for dissipating heat, which is generated when the light source of the aircraft light is operating, into the metallic body, which is provided within the cavity formed within the support board core layer. The metallic body may therefore also be referred to as a heat-absorbing metallic body or as a heat-distributing metallic body.

Soldering the metallic body to the second metallic layer provides for a mechanically stable and thermally conductive coupling between the metallic body and the second metallic layer, which may allow for efficiently transferring heat from the light source to the metallic body.

Arranging the metallic body in such a position within the cavity that an outer end face of the metallic body is sub-stantially flush with the back side of the light source support board contributes to a smooth back side of the light source support board. A smooth back side of the light source support board may make the installation of the light source support board in the aircraft light easier and/or may provide for more installation options in the aircraft light. The smooth back side may further facilitate a particularly beneficial installing of a heat sink on the back side of the light source support board.

The support board core layer may be the thickest layer of the plurality of layers of the light source support board. The support board core layer may be configured for providing mechanical strength to light source support board.

In an embodiment, the support board core layer has a thickness in the range of between 0.5 mm and 2.5 mm, in particular a thickness in the range of between 1.0 mm and 2.0 mm. Support board core layers having a thickness in this range have been found as providing good mechanical strength to the light source support board.

The support board core layer may be a non-metallic support board core layer The support board core layer may in particular be made of a synthetic material, such as FR 4, or of a ceramic material.

As the first metallic layer forms conductive traces on the support board, the first metallic layer does not continuously cover the isolating layer. Instead, the isolating layer com-prises covered portions, which are covered by the conduc-tive traces formed by the first metallic layer, and bare portions, which are not covered by the conductive traces formed by the first metallic layer. The light source support board may in particular be a printed circuit board.

In an embodiment, the conductive traces formed by the first metallic layer include conductive traces extending to the light source and electrically coupled to the light source, in order to allow for supplying electric power to the light source. Such conductive traces allow for efficiently supply-ing electric power to the light source.

In an embodiment, the light source is an LED. An LED provides an efficient and reliable light source at low costs.

In an embodiment, the isolating layer and second metallic layer are continuously formed between the first metallic layer and the support board core layer. Providing the isolating layer and the second metallic layer continuously between the first metallic layer and the support board core layer allows for the forming of the isolating layer and the second metallic layer in comparably simple manufacturing processes.

In an embodiment, the isolating layer and the second metallic layer are not continuously formed between the first metallic layer and the support board core layer. The isolating layer and the second metallic layer may in particular be formed in that portion/those portions of the light source support board in which a cavity/the cavities a formed, but may not be continuous around/in between that portion/those portions. Forming the isolating layer and the second metallic layer only in selected portions of the light source support board may allow for reducing the amount of material, which is needed for forming the isolating layer and the second metallic layer. Stated differently, the layered structure of the first metallic layer, the isolating layer, and the second metallic layer is present where the cavity is provided. The same layered structure may be present in other portions of the light source support board, but does not have to be present in other portions of the light source support board.

In an embodiment, the cavity is formed within the support board core layer, e.g. by drilling or by milling or by another form of machining, having an inner end side, which is opposite to the open side of the cavity. The inner end side of the cavity may be covered with a metallic material, forming the second metallic layer.

In an embodiment, the cavity is formed in a region of the light source support board, in which a second metallic layer and an isolating layer have been formed between the support board core layer and the first metallic layer. The cavity may in particular be machined from the back side of the light source support board into the support board core layer up to the second metallic layer.

In an embodiment, the light source of the aircraft light is arranged at a position of the light source support board, which is at or close to the position at which the cavity is formed, so that the light source and cavity are arranged in close proximity to each other. The light source and the cavity may in particular be arranged in positions which are aligned across the light source support board. In other words, the light source and the cavity may be not offset with respect to each other within a light source support board plane, which is defined as the plane, in which the light source support board extends. Arranging the light source in close proximity to the cavity and the metallic body, located within the cavity, may allow for a very efficient transfer of heat from the light source to the metallic body.

In an embodiment, the light source support board further comprises a third metallic layer, which is formed on the back side of the light source support board. In an embodiment comprising such a third metallic layer, the metallic body may be arranged within the cavity so that the outer end face of the metallic body is substantially flush with the third metallic layer. A third metallic layer, which is provided on the back side of the light source support board, may allow for soldering a heat sink to the back side of the light source support board in a particularly effective manner, thus enhancing the dissipation of heat from the metallic body. The third metallic layer may itself also contribute to an enhanced heat distribution. The third metallic layer may further provide electromagnetic shielding.

In an embodiment, a heat sink is provided on the back side of the light source support board. The heat sink may be mechanically and thermally coupled to the light source support board and/or to the outer end face of the metallic body. The heat sink may be soldered to the outer end face of the metallic body and/or to the back side of the light source support board. The heat sink may in particular be soldered to the third metallic layer, which is provided on the back side of the light source support board. For enhancing the dissipation of heat from the heat sink, the heat sink may comprise at least one cooling rib, extending from the heat sink.

Providing a heat sink may allow for an even more efficient dissipation of heat from the metallic body. Soldering the heat sink to the outer end face of the metallic body and/or to the back side of the light source support board may provide for a reliable and mechanically stable coupling, having a good thermal conductivity. This may allow for a very efficient transfer of heat from the metallic body to the heat sink.

In an embodiment, at least one lateral wall of the cavity is covered with a metallic material, forming a fourth metallic layer. In such an embodiment, the metallic body may be soldered to the second metallic layer and to portions of or all of the fourth metallic layer. This may allow for enhancing the mechanical and thermal coupling between the metallic body and the light source support board.

In an embodiment, each of the first metallic layer, the second metallic layer, the third metallic layer, and the fourth metallic layer has a thickness in the range of between 0.05 mm and 0.2 mm, in particular a thickness in the range of between 0.08 mm and 0.12 mm, further in particular a thickness of about 0.1 mm.

Metallic layers having a thickness in these ranges have been found to be a good compromise between mechanical stability and thermal and electric conductivity, provided by the respective metallic layer, on the one hand and the amount of metallic material needed for forming the respective metallic layer on the other hand.

In an embodiment, at least one or any subset or all of the first metallic layer, the second metallic layer, the third metallic layer and the fourth metallic layer is made of copper or silver or of an alloy comprising copper and/or silver. Metallic layers made of a material comprising cooper and/or silver have a good thermal conductivity.

In an embodiment, the first, second, third and fourth metallic layers are made from the same material. Forming all metallic layers of the light source support board from the same material may contribute to the production of the light source support board with low complexity, since only a single metallic material needs to be provided for forming all metallic layers of the light source support board.

In another embodiment, at least one of the first, second, third and fourth metallic layers is made from a different material than the other metallic layers. In an embodiment, two layers of the first, second, third and fourth metallic layers are made from a first material and the the other two layers of the first, second, third and fourth metallic layers are made from a second material that differs from the first material.

Using different materials for the different metallic layers may allow for optimizing the properties of the different layers with respect to their specific needs and functions. For example, harder materials, which are more resistant to mechanical damage, may be used for the first and third metallic layers, which are exposed to the environment, and softer materials, potentially having an even better thermal conductivity, may be used for the second and third layers, which are not exposed to the environment.

In an embodiment, the metallic body is made of copper or silver or of an alloy comprising copper and/or silver. Copper and/or silver have a good thermal conductivity. In consequence, a metallic body, which is made of a material comprising cooper and/or silver, has a good thermal conductivity as well.

In an embodiment, the metallic body is made of the same material as at least one of the first, second, third and fourth metallic layers. This may contribute to an efficient production of the light source support board including the metallic body, as no additional metallic material needs to be provided for forming the metallic body.

In an embodiment, the metallic body is made of a different material than the first, second, third and fourth metallic layers. Using a different material for the metallic body may allow for using an optimized metallic material selection for forming the metallic layers and the metallic body, respectively.

In an embodiment, the light source support board does not have a third metallic layer and/or does not have a fourth metallic layer, as described above. In other words, the third and fourth metallic layers are optional. In the absence of the third metallic layer, the outer end face of the metallic body may be substantially flush with the back side of the support board core layer.

In an embodiment, the metallic body has a substantially cylindrical shape, i.e. the metallic body has a substantially cylindrical outer contour. The metallic body may, for example, have the shape of a coin.

In an embodiment, the cavity has a substantially cylindrical shape for accommodating a metallic body having a substantially cylindrical shape.

Metallic bodies and cavities having substantially cylindrical shapes may be produced easily.

In an embodiment, the metallic body has a cylindrical main portion and a circular collar, which surrounds the cylindrical main portion. The circular collar may in particular surround one of the end faces of the cylindrical main portion. Such a shape is herein understood as being a kind of substantially cylindrical shape.

In an embodiment, the metallic body and/or the cavity have polygonal contours, for example rectangular contours, or contours having the shape of a hexagon, an octagon, or a decagon. Optionally, a metallic body having a polygonal contour may be provided with a collar having a polygonal contour.

In an embodiment, the metallic body has a metallic body lateral extension, i.e. an extension in a dimension that is aligned with the light source support board plane, and the cavity has a cavity lateral extension in said same dimension, wherein the lateral extension of the metallic body is smaller than the lateral extension of the cavity. Such a configuration results in a gap being formed between the outer contour of the metallic body and the lateral wall(s) defining the cavity. When the metallic body is soldered to the light source support board, liquid solder may flow into the gap. In this way, the metallic body may be conveniently pressed into the cavity, until the outer end face is substantially flush with the back side of the light source support board, with the solder having room in the gap to flow into. Solder curing within the gap may enhance the mechanical and thermal coupling between the metallic body and the light source support board. The lateral extension may be given as a one-dimensional value, in this case relating to the direction of largest extension in the light source support board plane, or as a two-dimensional value, in this case relating to the area of the lateral extension in the light source support board plane.

In an embodiment, the size of the area of the lateral extension of the metallic body is in the range of between 80% and 95%, in particular in the range of between 85% and 90%, of the area of the lateral extension of the cavity. A ratio in this range has been found as beneficial for forming a well-sized gap between the outer contour of the metallic body and the lateral wall defining the cavity.

In an embodiment, the cavity has a lateral extension in the range of between 2 mm and 30 mm, in particular a lateral extension in the range of between 5 mm and 20 mm, further in particular a lateral extension in the range of between 8 mm and 15 mm.

In an embodiment, at least one bore is formed in the metallic body. The at least one bore may extend from the inner end face of the metallic body into the metallic body. The at least one bore may in particular extend from the inner end face of the metallic body completely through the metallic body to the outer end face of the metallic body. In an embodiment, a plurality of bores may be formed in the metallic body.

At least one bore, which is formed in the metallic body, may allow for liquid solder to flow into the interior of the metallic body, when the metallic body is inserted into the cavity during the manufacturing of the aircraft light. Solder curing within the at least one bore, which is formed within the metallic body, may enhance the mechanical coupling and the thermal coupling between the metallic body and the light source support board. Also, the at least one bore may provide for additional room for the solder, thus contributing to a convenient pressing of the metallic body into the cavity, until the outer end face of the metallic body is substantially flush with the back side of the light source support board.

In an embodiment, a plurality of cavities are formed in the support board core layer, and a respective metallic body is arranged in at least some of the plurality of cavities. A respective metallic body may in particular be arranged in each of the plurality of cavities. A plurality of cavities comprising a plurality of metallic bodies may be employed for effectively dissipating the heat, which is generated by a plurality of light sources, arranged on the light source support board.

In an embodiment, a plurality of light sources are arranged on the light source side of the light source support board, and corresponding cavities are formed in the light source support board. A corresponding cavity may be associated with a particular one of the plurality of light sources. It is possible that some of the plurality of light sources or all of the plurality of light sources have a corresponding cavity associated therewith. Corresponding cavities may, for example, be formed below at least some or below all of the light sources for efficiently dissipating the heat from the respective light sources.

In an embodiment, the aircraft light further comprises a housing and a support structure for supporting the light source support board.

In an embodiment, the aircraft light comprises an at least partially light transmissive cover, which allows for light, emitted by the at least one light source, to pass through and exit the housing for providing the aircraft light output of the aircraft light.

In an embodiment, the aircraft light comprises at least one optical component, such as one or more lenses and/or one or more reflectors and/or one or more shutters, for forming the aircraft light output from the light emitted by the light source(s). The at least one optical component may be arranged between the light source support board and the light transmissive cover, in particular between the light source(s) and the light transmissive cover. The at least partially light transmissive cover may also have an optical effect in forming the aircraft light output and may be referred to as a lens cover.

In an embodiment, the aircraft light is an exterior aircraft light. The aircraft light may in particular be a landing light, a take-off light, a taxi light, a runway turn-off light, a navigation light, a logo light, a wing scan light, an engine scan light, a cargo loading light, or a multi-functional exterior aircraft light, which combines the functionalities of at least two of a landing light, a take-off light, a taxi light, a runway turn-off light, a navigation light, a logo light, a wing scan light, an engine scan light, and a cargo loading light.

The enhanced heat dissipation via the metallic body, as described herein, may be particularly beneficial in aircraft headlights, because aircraft headlights have a particularly high light intensity. In terms of the aircraft lights described above, the enhanced head dissipation via the metallic body, as described herein, may be particularly beneficial in a landing light, a take-off light, a taxi light, a runway turn-off light, and a multi-functional headlight, combining the functionalities of at least two of a landing light, a take-off light, a taxi light, and a runway turn-off light.

In an embodiment, the aircraft light is an interior aircraft light. The aircraft light may in particular be a passenger reading light, a cabin illumination light, a washroom illumination light, a signal light, an emergency light, or an exit light.

Exemplary embodiments of the invention further include a method of assembling an aircraft light, wherein the method includes providing a light source support board having a light source side for supporting a light source and an opposite back side. The light source support board comprises a first metallic layer forming conductive traces on the light source side, an isolating layer, a second metallic layer, and a support board core layer, with the isolating layer being arranged between the first metallic layer and the second metallic layer.

The method includes forming a cavity in the support board core layer, with the cavity being open to the back side of the light source support board; providing solder in the cavity on the second metallic layer; liquefying the solder; and pressing an inner end face of a metallic body into the liquefied solder, such that an opposite outer end face of the metallic body is substantially flush with the back side of the light source support board.

In an alternative embodiment, the light source support board does not comprise a second metallic layer when the cavity is formed. In this alternative embodiment, the method includes forming a cavity in the light source support board, which does not comprise a second metallic layer, and forming the second metallic layer at the inner end of the cavity, after the cavity has been formed. The method further includes providing solder in the cavity on the second metallic layer; liquefying the solder, and pressing an inner end face of a metallic body into the liquefied solder, such that an opposite outer end face of the metallic body is substantially flush with the back side of the light source support board.

It is also possible that liquefied solder is introduced into the cavity. In other words, the solder may be heated in order to by liquefied before and/or after it is introduced into the cavity.

According to an exemplary embodiment of the invention, a method of assembling an aircraft light of the invention may further include forming a plurality of cavities in the support board core layer, which are open to the back side of the light source support board; providing solder in each of the plurality of cavities on the second metallic layer; liquefying the solder in each of the plurality of cavities and pressing inner end faces of a plurality of metallic bodies into the liquefied solder within the plurality of cavities, such that opposite outer end faces of the metallic bodies are substantially flush with the back side of the light source support board. The inner end faces of a plurality of metallic bodies may in particular be pressed simultaneously into the liquefied solder within the plurality of cavities. It is also possible that liquefied solder is introduced into the cavity.

Optionally, the second metallic layer may be formed at the inner ends of the cavities only after the cavities have been formed within the support board core layer, as it has been described before with respect to a method which includes forming a single cavity.

Exemplary embodiments of the invention further include an aircraft, such as an airplane or a helicopter, which is equipped with at least one aircraft light according to an exemplary embodiment of the invention. The additional features, modifications and effects, as described above with respect to an aircraft light and/or with respect to a method of assembling an aircraft light, apply to the aircraft in an analogous manner.

BRIEF DESCRIPTION OF THE DRAWINGS

Further exemplary embodiments of the invention are described below with respect to the accompanying drawings, wherein:

FIG. 1B shows a schematic front view of the aircraft shown in FIG. 1A;

DETAILED DESCRIPTION

Figure 1A:
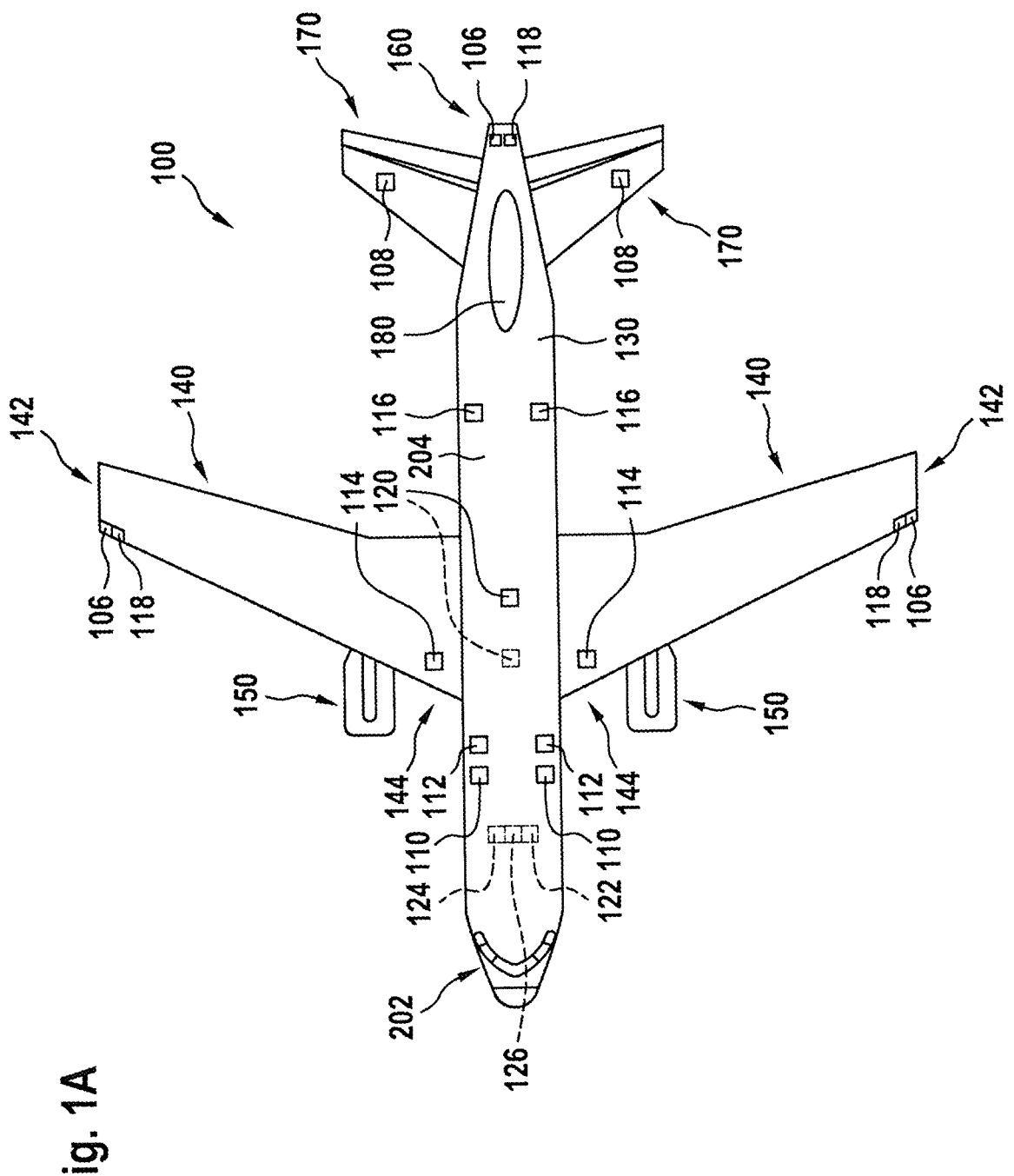
FIG. 1A shows a schematic top view of an aircraft, which is equipped with a variety of exterior aircraft lights.
Figure 1B:
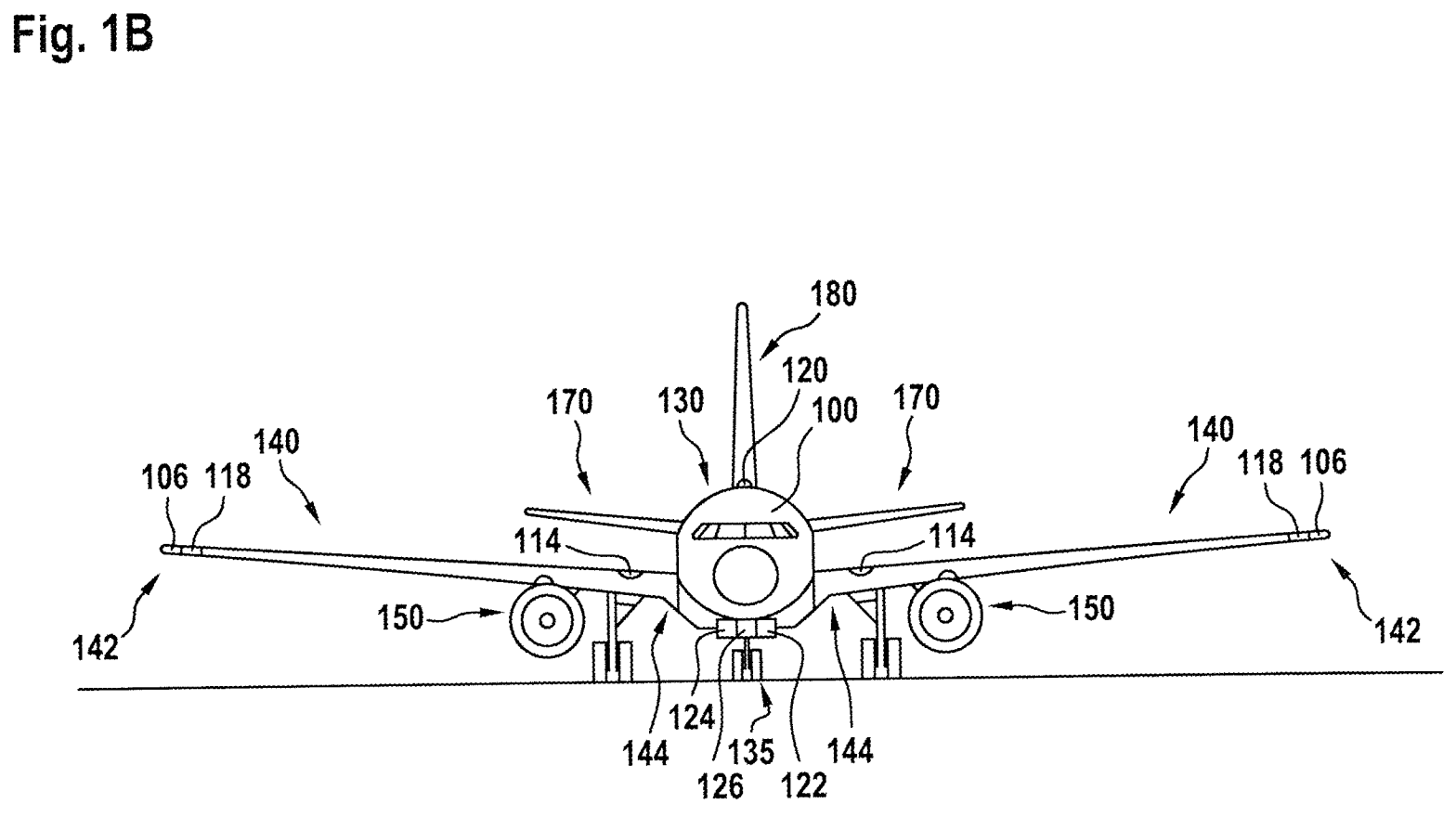

FIGS. 1A and 1B, jointly referred to as FIG. 1 herein, show an aircraft 100, in particular an airplane, comprising a fuselage 130, which houses a cockpit 202 and a passenger cabin 204, and two wings 140, extending from the fuselage 130. Two horizontal stabilizers 170 and a vertical stabilizer 180 extend from a rear portion of the fuselage 130. An engine 150 is mounted to each of the wings 140, respectively. The aircraft 100 is shown in a top view in FIG. 1A and shown in a front view in FIG. 1B.

The aircraft 100 of FIG. 1 is equipped with a wide variety of exterior lights. In particular, the aircraft 100 is equipped with three navigation lights 106, two logo lights 108, two wing scan lights 110, two engine scan lights 112, two runway turn-off lights 114, two cargo loading lights 116, three white anti-collision strobe lights 118, two red-flashing anti-collision beacon lights 120, a landing light 122, a take-off light 124, and a taxi light 126. It is pointed out that these kinds of lights and their numbers are exemplary only and that the aircraft 100 may be equipped with additional lights that are not shown.

The three navigation lights 106 are positioned in the left and right wing tips 142 as well as at the tail 160 of the aircraft 100. In normal flight conditions, each one of the navigation lights 106 emits light in one of the colors green, red and white, thus indicating to the aircraft environment if they are looking at the port side, starboard side or tail side of the aircraft. The navigation lights 106 are normally on during all phases of the flight and in all flight conditions. The logo lights 108 are directed to the vertical stabilizer 180 of the aircraft 100 and are provided for illuminating the same, in particular for illuminating the logo commonly provided on the vertical stabilizer 180. The logo lights 108 are normally switched on for the entire duration of the flight during night flights. It is also possible that the logo lights are only used during taxiing on the airport and are normally switched off during the flight.

The wing scan lights 110 and the engine scan lights 112 are positioned on the left and right sides of the fuselage 130, in front of the roots 144 of the wings 140 of the aircraft 100. The wing scan lights 110 and the engine scan lights 112 are normally off during the flight and may be switched on periodically or upon reasonable cause by the pilots or by the aircrew, in order to check the wings 140 and the engines 150 of the aircraft 100.

The runway turn-off lights 114 are positioned in the roots 144 of the wings 140. The runway turn-off lights 114 are directed forwards and are normally switched off during the flight and switched on during taxiing, at least at night.

The cargo loading lights 116 are positioned on the left and right sides of the fuselage 130, behind the wings 140 and in front of the tail structure of the aircraft 100. They are normally switched off during the flight of the aircraft 100.

The white anti-collision strobe lights 118 are positioned in the left and right wing tips 142 as well as at the tail 160 of the aircraft 100. The white anti-collision strobe lights 118 emit respective sequences of white light flashes during normal operation of the aircraft 100. It is also possible that the white anti-collision strobe lights 118 are only operated during night and in bad weather conditions.

The red-flashing anti-collision beacon lights 120 are positioned on the top and the bottom of the fuselage 130 of the aircraft 100. They are arranged at the height of the wings in the longitudinal direction of the aircraft 100. While one of the red-flashing anti-collision beacon lights 120 is disposed on the top of the fuselage 130, the other one of the red-flashing anti-collision beacon lights 120 is disposed on the bottom of the fuselage 130 and is therefore shown in phantom in FIG. 1A. The red-flashing anti-collision beacon lights 120 are normally switched on during taxiing and during take-off and landing. Their output is perceived as a sequence of red light flashes in a given viewing direction.

In the embodiment depicted in FIGS. 1A and 1B, the runway turn-off lights 114 are located in the wings 140, in particular in the roots 144 of the wings 140, and the landing light 122, the take-off light 124 and the taxi light 126 are mounted to the front gear 135 of the aircraft 100. The front gear 135 is stored within the fuselage 130 of the aircraft 100 during flight, and it is deployed during landing, taxiing and take off.

In alternative embodiments, which are not explicitly shown in the figures, the runway turn-off lights 114 may be mounted to the front gear 135 and/or at least one of the landing light 122, the take-off light 124 and the taxi light 126 may be installed in the wings 140, in particular in the roots 144 of the wings 140, of the aircraft 100.

The aircraft 100 may also comprise one or more multi-functional lights, which combine(s) the functionalities of at least two of a landing light, a take-off light, a taxi light, a runway turn-off light, a navigation light, a white strobe anti-collision light, and a red-flashing beacon light.

Since the landing light 122, the take-off light 124, and the taxi light 126 are arranged on the bottom of the aircraft 100, they are also depicted in phantom in FIG. 1A.

Each of these exterior aircraft lights may be an aircraft light according to an exemplary embodiment of the invention.

Figure 2:
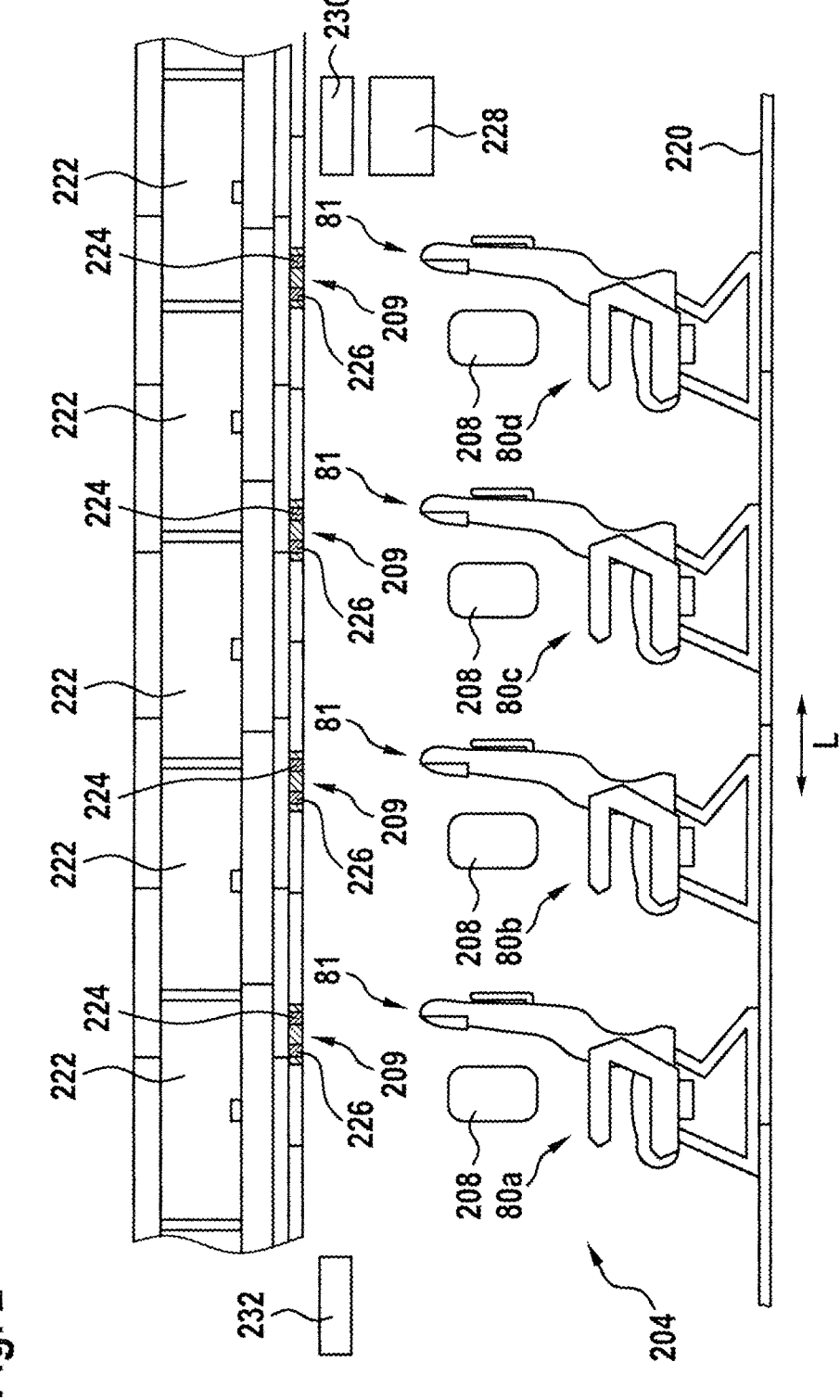
FIG. 2 shows a schematic longitudinal cross-sectional view of a section of the passenger cabin of the aircraft shown in FIGS. 1A and 1B.

FIG. 2 shows a schematic longitudinal cross-sectional view of a section of the passenger cabin 204 of the aircraft 100 shown in FIG. 1.

Four seats 81, which are also referred to as passenger seats 81, are visible in FIG. 2. The passenger seats 81 are mounted to a floor 220 of the passenger cabin 204. Each of the depicted passenger seats 81 belongs to a different seat row 80a-80d. The seat rows 80a-80d are spaced apart from each other along the longitudinal direction L of the passenger cabin 204.

For each of the seat rows 80a-80d, a window 208 is provided, which allows the passengers to view the outside of the aircraft 100. Further, a plurality of overhead baggage compartments 222, which provide storage space for the passengers' baggage, are provided above the passenger seats 81.

Each seat row 80a-80d may include a plurality of passenger seats 81, for example three passenger seats 81, which are arranged next to each other along a lateral direction, which is orthogonal to the longitudinal direction L. The additional passenger seats, i.e. the middle seat and the window seat, of each seat row 80a-80d are not visible in FIG. 2, as they are arranged behind and therefore hidden by the depicted aisle seats 81.

An aircraft overhead passenger service unit (PSU) 209 is provided above each of the seat rows 80a-80d, respectively.

Each of the aircraft overhead passenger service units 209 may comprise at least one interior aircraft light. Each of the aircraft overhead passenger service units 209 may, for example, comprise a plurality of passenger reading lights 224, wherein the light output of each of the passenger reading lights 224 is directed towards one of the passenger seats 81 arranged below the respective aircraft overhead passenger service unit 209. Each of the aircraft overhead passenger service units 209 may further comprise one or more signal lights 226, which may, for example, light up in case a request for the cabin service personnel has been triggered by a passenger or in case a passenger instruction, such as a fasten your seat belt symbol, is depicted to the passenger.

The passenger cabin 204 may further comprise at least one general cabin illumination light 228 for illuminating the passenger cabin 204, at least one emergency light 230 for providing illumination in an emergency situation, and/or at least one exit light 232 for indicating an emergency exit location and/or for illuminating an exit path out of the aircraft.

Each of the interior aircraft lights depicted in FIG. 2 may be an aircraft light 2 according to an exemplary embodiment of the invention.

Figure 3:
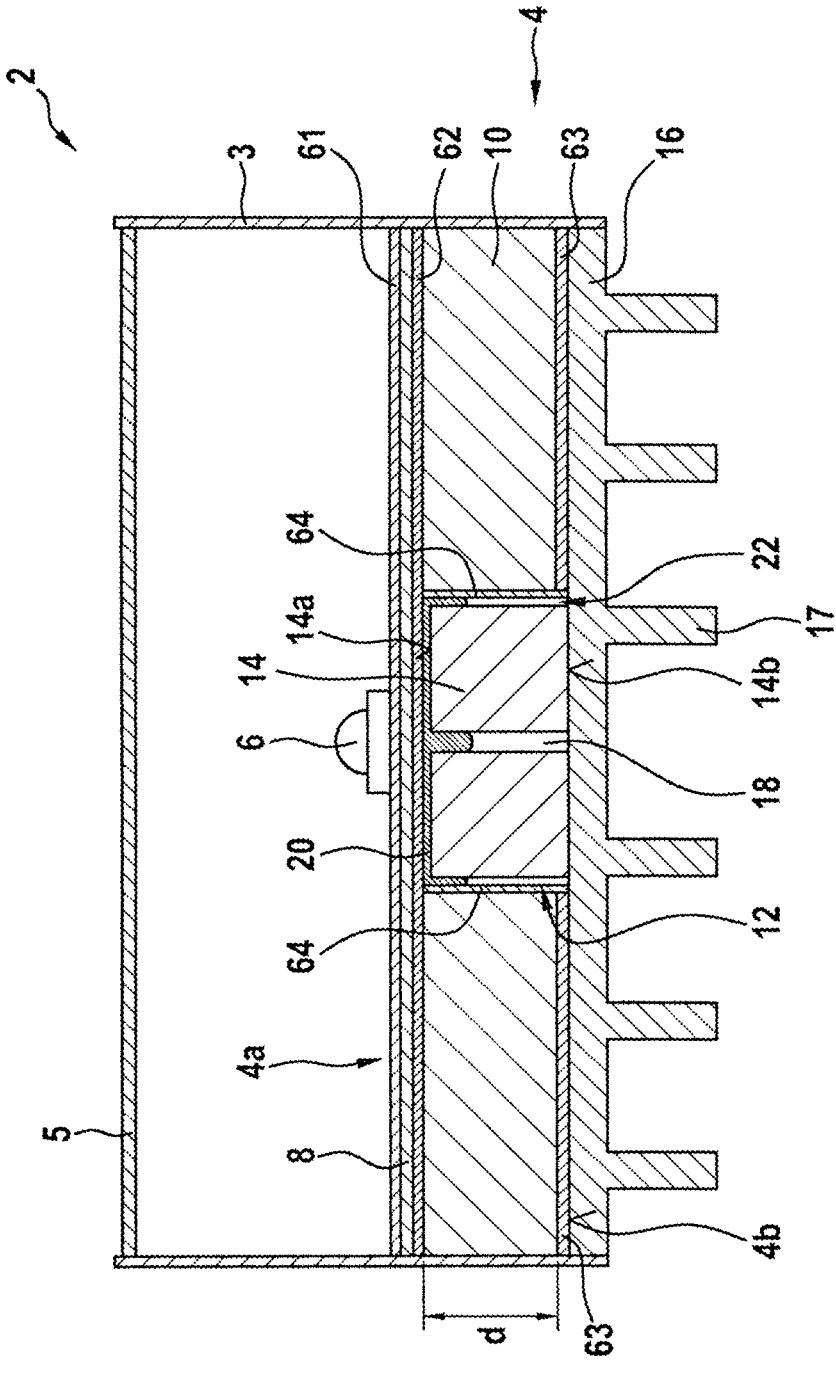
FIG. 3 shows a schematic cross-sectional view of an aircraft light according to an exemplary embodiment of the invention.

FIG. 3 depicts a schematic cross-sectional view of an aircraft light 2 according to an exemplary embodiment of the invention.

The aircraft light 2 comprises a light source support board 4. The light source support board 4 has a light source side 4a and an opposite back side 4b and extends along a light source support board plane.

The aircraft light 2 further comprises a light source 6, which is mounted to the light source side 4a of the light source support board 4.

The aircraft light 2 comprises a housing 3 and an at least partially light transmissive cover 5, which allows for light, which is emitted by the light source 6, to pass through and exit the housing 3 for providing the aircraft light output of the aircraft light 2.

The light source support board 4, which may be a printed circuit board, has a layered structure comprising a first metallic layer 61, an isolating layer 8, a second metallic layer 62, and a support board core layer 10. The layers 61, 8, 62, 10 are arranged adjacent to each other along a direction, which is oriented perpendicular to the light source support board plane.

The support board core layer 10 may be configured for providing mechanical strength to light source support board 4.

The support board core layer 10 may in particular have a thickness in the range of between 0.5 mm and 2.5 mm, in particular a thickness d in the range of between 1.0 mm and 2.0 mm.

The isolating layer 8 may have a thickness in the range of between 0.05 mm and 0.5 mm, in particular thicknesses in the range of between 0.05 mm and 0.2 mm.

The isolating layer 8 and/or the support board core layer 10 may be made of a synthetic material or of a ceramic material. One or both of the isolating layer 8 and the support board core layer 10 may in particular be made of FR-4.

The isolating layer 8 is arranged between the first metallic layer 61 and the second metallic layer 62, electrically isolating the second metallic layer 62 from the first metallic layer 61.

The first metallic layer 61 does not cover the isolating layer 8 completely. In other words, the first metallic layer 61 is formed only on selected portions of the isolating layer 8.

The first metallic layer 61 may in particular form conductive traces on the light source side 4a of the light source support board 4. The first metallic layer 61 may, for example, form conductive traces, extending to the light source 6 and being electrically coupled to the light source 6 for supplying electric power to the light source 6. The light source 6 may be an LED. A cavity 12 is formed in the support board core layer 10. The cavity 12 may extend between the second metallic layer 62 and the back side 4b of the light source support board 4. The cavity 12 may be open to the back side 4b of the light source support board 4.

The isolating layer 8 and the second metallic layer 62 may extend continuously over the complete light source support board 4. This is, however, optional and not mandatory. The isolating layer 8 may, for example, be formed only in those portions of the light source support board 4, in which electric isolation needs to be provided.

It is also possible that the second metallic layer 62 is formed only in those portions of the light source support board 4 in which the cavity 12 or a plurality of cavities are formed, and that no second metallic layer 62 is formed in those portions of the light source support board 4 in which no cavities are formed.

The second metallic layer 62 may in particular be applied to an inner end face of a cavity 12, after the cavity 12 has been formed within the support board core layer 10.

Alternatively, a light source support board 4 that comprises a layered structure including a first metallic layer 61, an isolating layer 8, a second metallic layer 62 and a support board core layer 10, as it is shown in FIG. 3, may be manufactured with extended layers, and a cavity 12 extending from the back side 4b of the light source support board 4 up to the second metallic layer 62 may be formed within the support board core layer 10 of the light source support board 4. The at least one cavity 12 may, for example, be drilled or milled or machined in another suitable manner from the back side 4b of the light source support board 4 into the support board core layer 10.

In other words, the layered structure of a first metallic layer 61, an isolating layer 8 and a second metallic layer 62 is formed at least in those portions of the light source support board 4, in which a cavity 12 is formed.

In those portions of the light source support board 4, in which no cavities 12 are formed, the light source support board 4 may comprise a first metallic layer 61, an isolating layer 8 and/or a second metallic layer 62, but not all of these layers 61, 8, 62 need to be present in these other portions.

The aircraft light 2 further comprises a metallic body 14, which is arranged within the cavity 12.

The metallic body 14 has an inner end face 14a, which is coupled to the second metallic layer 62, and an outer end face 14b, which is substantially flush with the back side 4b of the light source support board 4.

The inner end face 14a may be coupled to the second metallic layer 62 by soldering using solder 20. The solder 20 may comprise lead. Alternatively, the solder 20 may be a lead-free solder.

The light source 6 and the cavity 12 are aligned with each other. In other words, the light source 6 and the cavity 12 are arranged in close proximity to each other. The light source 6 and the cavity 12 are in particular not offset with respect to each other in a direction, which is parallel to/within the light source support board plane.

The light source 6 may in particular be arranged at a position of the light source support board 4 under which the cavity 12 is formed. In other words, the light source 6 may be arranged on top of the cavity 12, which is formed in the light source support board 4, and thereby also on top of the metallic body 14 arranged within the cavity 12. The terms "under" and "on top" refer to the orientation of the aircraft light 2 depicted in FIG. 3. Different orientations of the aircraft light 2 are possible as well. An aircraft light 2 according to an exemplary embodiment of the invention may be mounted to an aircraft 100 in orientations which differ from the orientation depicted in FIG. 3, without deviating from the scope of the present invention.

The metallic body 14 may absorb and distribute heat, which is generated by the light source 6 in operation. The metallic body 14 may therefore also be denoted as a heat-absorbing metallic body 14 or as a heat-distributing metallic body 14.

A heat sink 16, which may comprise one or more cooling ribs 17, may be thermally coupled to the outer end face 14b of the metallic body 14 for absorbing and dissipating heat from the the the metallic body 14.

The heat sink 16 may also be thermally coupled to the back side 4b of the light source support board 4 or at least to portions of the back side 4b of the light source support board 4.

Optionally, the light source support board 4 may comprise a third metallic layer 63, which may be formed on at least a portion of the back side 4b of the light source support board 4, and the heat sink 16 may be coupled, for example soldered, to said third metallic layer 63.

In a configuration, in which at least a portion of the back side 4b of the light source support board 4 is covered with a third metallic layer 63, the metallic body 14 may be arranged within the cavity 12 so that the outer end face 14b of the metallic body 14 is substantially flush with the third metallic layer 63, as it is depicted in FIG. 3.

In an alternative configuration, which is not explicitly shown in the figures and in which no third metallic layer is formed on the back side 4b of the light source support board 4, the outer end face 14b of the metallic body 14 may be substantially flush with the back side of the support board core layer 10, constituting the back side 4b of the light source support board 4.

The light source support board 4 may further comprises a fourth metallic layer 64, which is provided on at least one lateral wall of the cavity 12, in particular on a lateral wall which extends between the second metallic layer 62 and the back side 4b of the light source support board 4. At least a portion of the outer periphery of the metallic body 14 may be mechanically and thermally coupled to, in particular soldered to, the fourth metallic layer 64.

Each of the first, second, third and fourth metallic layers 61, 62, 63, 64 may have a thickness in the range of between 0.05 mm and 0.2 mm, in particular a thickness in the range of between 0.08 mm and 0.12 mm, further in particular a thickness of about 0.1 mm.

Each of the first, second, third and fourth metallic layers 61, 62, 63, 64 may be made of a metal having a good thermal conductivity. Each of the first, second, third and fourth metallic layers 61, 62, 63, 64 may, for example, be made of copper or silver or of an alloy comprising copper and/or silver.

The first, second, third and fourth metallic layers 61, 62, 63, 64 may be made of the same metallic material.

Alternatively, at least one of the first, second, third and fourth metallic layers 61, 62, 63, 64 may be made from a different material than the other metallic layers 61, 62, 63, 64.

It is also possible that two layers of the first, second, third and fourth metallic layers 61, 62, 63, 64 are made from a first material and that the other two layers of the first, second, third and fourth metallic layers 61, 62, 63, 64 are made from a second material that differs from the first material.

The metallic body 14 may be made of a metal having a good thermal conductivity. The metallic body 14 may, for example, be made of copper or silver or an alloy comprising copper and/or silver.

The metallic body 14 may be made of the same material as at least one of the first, second, third and fourth metallic layers 61, 62, 63, 64. Alternatively, the metallic body 14 may be made of another material than the first, second, third and fourth metallic layers 61, 62, 63, 64. The metallic body 14 may have a substantially cylindrical shape. In other words, the outer contour of the metallic body 14 may be substantially cylindrical.

The cavity 12 may also have a substantially cylindrical shape, which corresponds to the substantially cylindrical shape of the metallic body 14, in order to allow inserting the metallic body 14 smoothly into the cavity 12.

Figure 4:
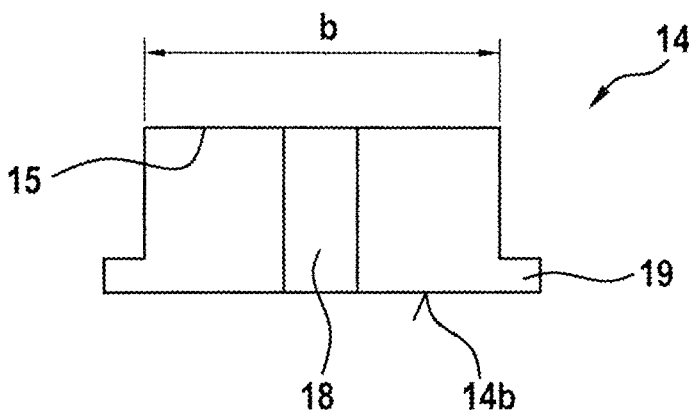
FIG. 4 shows a cross-sectional view of a metallic body of an aircraft light according to an exemplary embodiment of the invention.

In an embodiment, the metallic body 14 may comprise a cylindrical main portion 15 and a circular collar 19, which is formed at one of the end faces 14a, 14b of the metallic body 14. FIG. 4 shows a cross-sectional view of a metallic body 14 of an aircraft light 2 according to an exemplary embodiment of the invention, which metallic body 14 comprises a cylindrical main portion 15 and a circular collar 19, surrounding the outer end face 14b of the metallic body 14.

In further embodiments, which are not explicitly depicted in the figures, the metallic body 14 and the cavity 12 may have a polygonal contour, respectively. The polygonal contour may, for example, be a rectangular contour, or a contour having the shape of a hexagon, an octagon, or a decagon.

The metallic body 14 has a lateral extension b, as depicted in FIG. 4, i.e. an extension b in a direction that is parallel to/within the light source support board plane. The extension b is smaller than the lateral extension of the cavity 12. The difference between the lateral extensions results in a gap 22 being formed between the outer contour of the metallic body 14 and the lateral wall defining the cavity 12, when the metallic body 14 is placed within the cavity 12.

The area of the lateral extension of the metallic body 14 may be in the range of between 80% and 95%, in particular in the range of between 85% and 90%, of the area of the lateral extension of the cavity 12.

The cavity 12 may have a lateral extension in the range of between 5 mm and 20 mm, in particular a lateral extension in the range of between 8 mm and 15 mm, in one dimension.

At least one bore 18 may formed in the the metallic body 14. The at least one bore 18 may extend from the inner end face 14a of the metallic body 14 into the metallic body 14. The at least one bore 18 may in particular extend completely through the metallic body 14, as it is depicted in FIGS. 3 and 4.

The lateral extension of the at least one bore 18 may be in the range of between 0.5 mm and 5 mm, more particularly in the range of between 0.5 mm and 3 mm.

Figure 5:
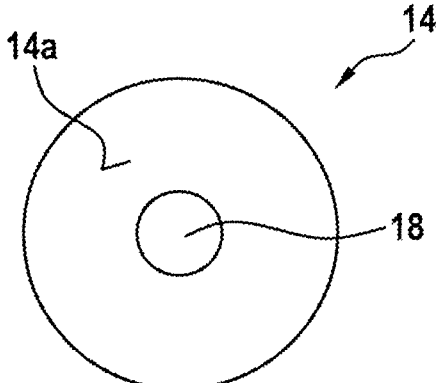
FIG. 5 shows an inner end face of a metallic body comprising a single bore, as may be used in an aircraft light according to an exemplary embodiment of the invention.

A single bore 18 may be formed in a central portion of the metallic body 14, as it is depicted in FIGS. 3, 4 and 5. FIG. 5 shows an inner end face 14a of a metallic body 14 with a single bore 18, which is formed in the center of the metallic body 14.

In an alternative embodiment, a plurality of bores 18 may be formed in the metallic body 14.

Figure 6:
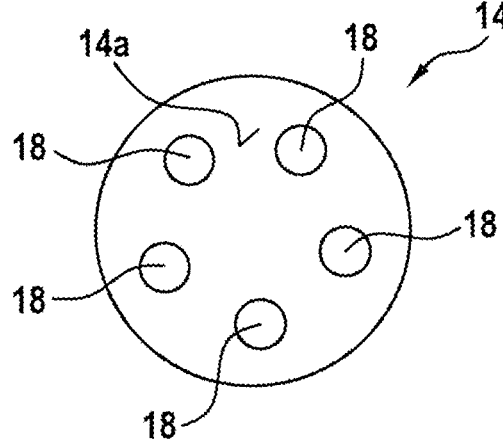
FIG. 6 shows an example of an inner end face of a metallic body with five bores, as may be used in an aircraft light according to an exemplary embodiment of the invention.

FIG. 6 shows an example of an inner end face 14a of a metallic body 14, in which five bores 18 are formed. In the embodiment depicted in FIG. 6, the five bores 18 are arranged along a circular line, which is aligned coaxially with the cylindrical metallic body 14.

Further embodiments of a metallic body 14, which are not explicitly depicted in the figures, may comprise different numbers and configurations of bores 18. In other words, a metallic body 14 of an aircraft light 2 according to an exemplary embodiment of the invention may comprise more or less than five bores 18, and the bores 18 may be arranged in configurations that differ from the configuration depicted in FIG. 6.

Although only a single light source 6, a single cavity 12, and a single metallic body 14 are depicted in FIG. 3, an aircraft light 2 according to an exemplary embodiment of the invention may comprise a plurality of light sources 6 and may comprise a light source support board 4 in which a plurality of cavities 12 are formed in the support board core layer 10. A respective metallic body 14 may be arranged in at least some, in particular in all, of the plurality of cavities 12.

In an aircraft light 2 comprising a plurality of light sources 6, a plurality of cavities 12 and a plurality of metallic bodies 14, a respective cavity 12, housing a metallic body 14, may be associated with each one of at least some of the plurality of light sources 6, in order to allow for dissipating the heat, which is generated when the respective light source 6 is operated, into an associated metallic body 14. A respective cavity 12, housing a respective metallic body 14, may in particular be arranged opposite to, for example below, each one of at least some of the light sources 6. A respective cavity 12, housing a respective metallic body 14, may in particular be associated with every light source 6 of the aircraft light 2.

Figure 7:
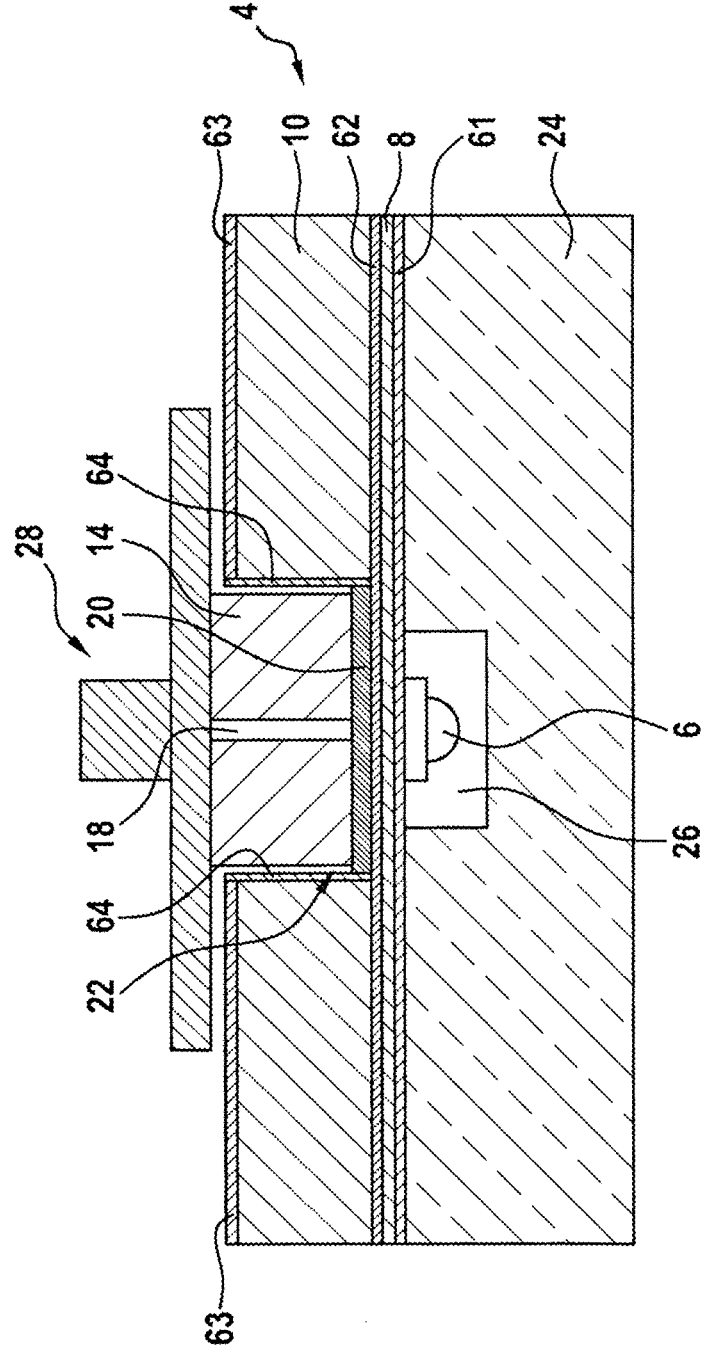
FIG. 7 schematically illustrates a method of installing a metallic body in a cavity of light source support board of an aircraft light according to an exemplary embodiment of the invention.

FIG. 7 schematically illustrates a method of installing a metallic body 14 in a cavity 12, which is provided in a light source support board 4 of an aircraft light 2 according to an exemplary embodiment of the invention.

When compared to FIG. 1, the light source support board 4, as depicted in FIG. 7, is arranged in an upside-down orientation.

When an aircraft light 2 according to an exemplary embodiment of the invention is installed in an aircraft 100, the light source support board 4 may be oriented in any orientation, depending on the orientation of the aircraft light 2 within the aircraft 100. The light source support board 4 may, for example, be oriented in a basically horizontal orientation, as it is depicted in FIGS. 1 and 7. The light source support board 4 may also be oriented in a basically vertical orientation, which is rotated by 90 degrees with respect to the orientations depicted in FIGS. 1 and 7. The light source support board 4 may further be orientated in an arbitrarily inclined orientation, in which the light source support board 4 is rotated by more or less than 90 degrees with respect to the basically horizontal orientation, depicted in FIGS. 1 and 7.

In the configuration depicted in FIG. 7, which illustrates a manufacturing step of the aircraft light 2, the light source side 4a of the light source support board 4 is supported on an upper surface of a support 24. The support 24 is a tool used during the manufacturing step in question.

A recess 26 for accommodating the light source 6, which is mounted to the light source side 4a of the light source support board 4, is formed within the upper surface of the support 24.

Although only a single recess 26 is depicted in FIG. 7, a plurality of recesses 26 for accommodating a plurality of light sources 6 may be provided in the upper surface of the support 24.

For installing the metallic body 14 within the cavity 12, a suitable amount of solder 20 is introduced into the cavity 12 and arranged on the second metallic layer 62, which is provided at the inner end of the cavity 12. The solder 20 is heated for liquefying the solder 20. It is also possible that liquefied solder 20 is introduced into the cavity 12. In other words, the solder 20 may be heated before and/or after it is introduced into the cavity 12.

In a next step, the metallic body 14 is introduced into the cavity 12, with the inner end face 14a of the metallic body 14 facing the second metallic layer 62 and the solder 20. Next, a plunger 28 presses onto the outer end face 14b of the metallic body 14 for pressing the inner end face 14a of the metallic body 14 into the liquefied solder 20, which is provided on the second metallic layer 62.

In particular, the plunger 28 presses onto the outer end face 14b of the metallic body 14, until the plunger 28 strikes against the back side 4b of the light source support board 4, so that the outer end face 14b of the metallic body 14 is flush with the back side 4b of the light source support board 4.

The plunger 28 may continue holding the metallic body 14 in the desired position, in which the outer end face 14b of the metallic body 14 is flush with the back side 4b of the light source support board 4, until the solder 20 has cured. The cured solder 20 fixes the metallic body 14 within the cavity 12 by providing a solder connection between the inner end face 14a of the metallic body 14 and the second metallic layer 62 at the inner end of the cavity 12.

When the metallic body 14 is pressed into the cavity 12 by the plunger 28, a portion of the liquefied solder 20 flows into the gap 22, which is formed between the outer contour of the metallic body 14 and the lateral wall defining the cavity 12. In case at least one bore 18 is formed within the metallic body 14, some solder flows into said at least one bore 18 as well, as it is depicted in FIG. 3. With the gap 22 and/or the at least one bore 18, there is provided a space into which the solder may flow, until the outer end face 14b of the metallic body 14 is flush with the back side 4b of the light source support board 4. The gap 22 and/or the at least one bore 18 may provide for a suitable clearance that allows for achieving both a strong solder connection and a desired positioning the metallic body 14.

The solder 20 flowing into the gap 22 results in an additional solder connection being formed between the outer contour of the metallic body 14 and the fourth metallic layer 64 formed on the lateral wall of the cavity 12.

This additional solder connection may enhance the mechanical and thermal coupling between the metallic body 14 and the light source support board 4 even further.

In an embodiment comprising a plurality of cavities 12, a plurality of metallic bodies 14 may be introduced into the plurality of cavities 12, and the plurality of metallic bodies 14 may be simultaneously pressed into the cavities 12 by a single plunger 28, which simultaneously acts on all metallic bodies 14.

After the solder 20 has cured, the plunger 28 is removed from the outer end face 14b of the metallic body 14 and from the back side 4b of the light source support board 4.

Optionally, a heat sink 16, which may comprise one or more cooling ribs 17, may be thermally coupled to the outer end face 14b of the metallic body 14 and/or the back side 4b of the light source support board 4, after the plunger 28 has been removed.

The heat sink 16 may by soldered to the outer end face 14b of the metallic body 14 and/or to the third metallic layer 63, which may be provided on the back side 4b of the light source support board 4.

Alternatively, an adhesive and/or at least one fastening element, such as a bolt or or a screw (not shown), may be employed for fixing the heat sink 16 to the back side 4b of the light source support board 4.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

What is claimed is:

1. An aircraft light, comprising:
a light source support board, having a light source side and a back side; and
a light source, arranged on the light source side of the light source support board;
wherein the light source support board comprises:
a first metallic layer, the first metallic layer forming conductive traces on the light source side of the light source support board;
an isolating layer;
a second metallic layer, wherein the isolating layer is arranged between the first metallic layer and the second metallic layer and isolates the second metallic layer from the first metallic layer; and
a support board core layer;
wherein a cavity is provided in the support board core layer and extending through the back side of the light source support board;
wherein the aircraft light further comprises a metallic body having a first lateral extension less than a second lateral extension of the cavity and arranged within the cavity of the light source support board; and
wherein the metallic body has an inner end face, which is soldered to the second metallic layer, and an outer end face, which is substantially flush with the back side of the light source support board.

2. The aircraft light according to claim 1, wherein the light source support board is a printed circuit board.

3. The aircraft light according to claim 1,
wherein the light source support board further comprises a third metallic layer, which is provided on the back side of the light source support board, and wherein the outer end face of the metallic body is substantially flush with the third metallic layer; and/or
wherein the light source support board further comprises a fourth metallic layer, which is provided on a lateral wall of the cavity.

4. The aircraft light according to claim 3, wherein the first metallic layer and/or the second metallic layer and/or the third metallic layer and/or the fourth metallic layer has a thickness of between 0.05 mm and 0.2 mm.

5. The aircraft light according to claim 4, wherein the thickness of the first metallic layer and/or the second metallic layer and/or the third metallic layer and/or the fourth metallic layer is between 0.08 mm and 0.12 mm.

6. The aircraft light according to claim 3,
wherein the first metallic layer and/or the second metallic layer and/or the third metallic layer and/or the fourth metallic layer are made of copper or silver; and/or
wherein the metallic body is made of copper or silver;
wherein the metallic body is in particular made of the same metal as the first metallic layer and/or the second metallic layer and/or the third metallic layer and/or the fourth metallic layer.

7. The aircraft light according to claim 1,
wherein the metallic body has a substantially cylindrical shape; and/or
wherein the cavity has a substantially cylindrical shape.

8. The aircraft light according to claim 1, wherein the second lateral extension is between 2 mm and 30 mm.

9. The aircraft light according to claim 8 wherein the first lateral extension is is between 80% and 95% in area of the second lateral extension of the cavity.

10. The aircraft light according to claim 9, wherein the second lateral extension is between 5 mm and 20 mm and the first lateral extension is between 85% and 90% in area of the second lateral extension of the cavity.

11. The aircraft light according to claim 1, wherein at least one bore is formed in the metallic body, wherein the at least one bore extends from the inner end face of the metallic body into the metallic body.

12. The aircraft light according to claim 11, wherein the first metallic layer, the isolating layer, and the second metallic layer each extend from a first end of the light source support board to a second end of the light source support board and the at least one bore extends through the metallic body.

13. The aircraft light according to claim 1, wherein a heat sink is thermally coupled to the back side of the light source support board.

14. The aircraft light according to claim 1,
wherein a plurality of cavities are provided in the support board core layer, in which a plurality of metallic bodies are arranged; and/or
wherein a plurality of light sources are arranged on the light source side of the light source support board;
wherein a respective cavity, housing a respective metallic body, is associated with each of the plurality of light sources.

15. The aircraft light according to claim 1,
wherein the support board core layer of the light source support board and/or the isolating layer of the light source support board are made of at least one of a ceramic material or of a synthetic material; and/or
wherein the support board core layer of the light source support board has a thickness of between 0.5 mm and 2.5 mm.

16. The aircraft light according to claim 1,
wherein the aircraft light is an exterior aircraft light.

17. An aircraft comprising at least one aircraft light according to claim 1.

18. The aircraft light according to claim 1, wherein the aircraft light is an interior aircraft light.

19. A method of assembling an aircraft light, wherein the method includes:
providing a light source support board having a light source side for supporting a light source and a back side, wherein the light source support board comprises a first metallic layer forming conductive traces on the light source side, an isolating layer, a second metallic layer, and a support board core layer;
forming a cavity in the support board core layer, which is open to the back side of the light source support board;
providing solder in the cavity on the second metallic layer; and
liquefying the solder and pressing an inner end face of a metallic body into the liquefied solder, such that an opposite outer end face of the metallic body is substantially flush with the back side of the light source support board.

20. The method of claim 19, further comprising:
forming a plurality of cavities in the support board core layer, which are open to the back side of the light source support board; and
providing solder in each of the plurality of cavities on the second metallic layer liquefying the solder in each of the plurality of cavities and simultaneously pressing inner end faces of a plurality of metallic bodies into the liquefied solder within the plurality of cavities, such that opposite outer end faces of the metallic bodies are substantially flush with the back side of the light source support board.

\* \* \* \* \*